Feb. 3, 1942.  R. H. SHEPPARD  2,271,606
COMBUSTION CHAMBER
Filed Sept. 14, 1938
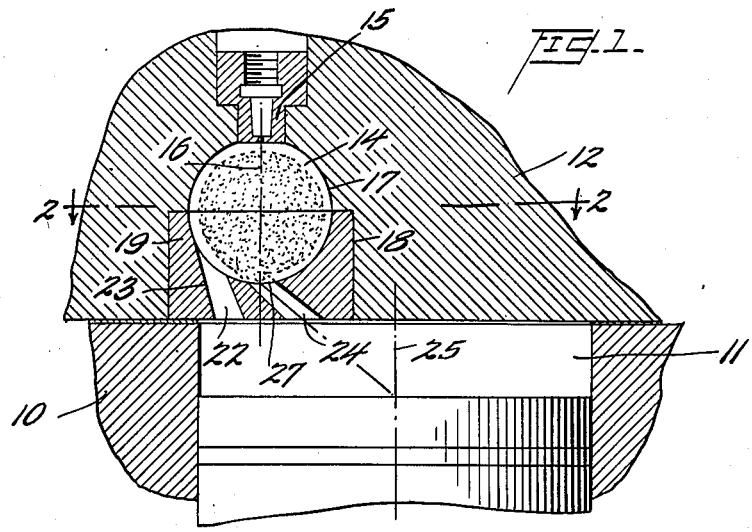
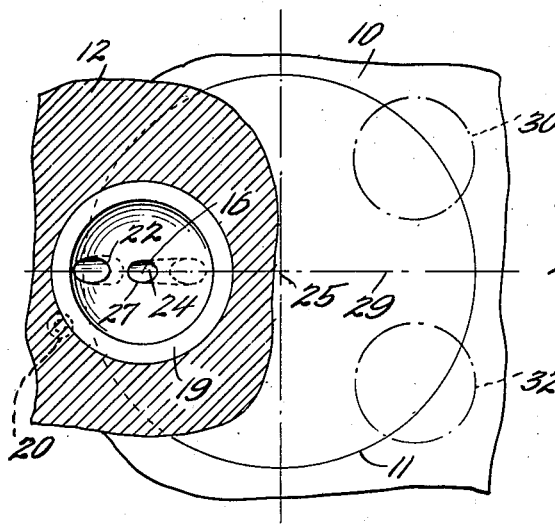
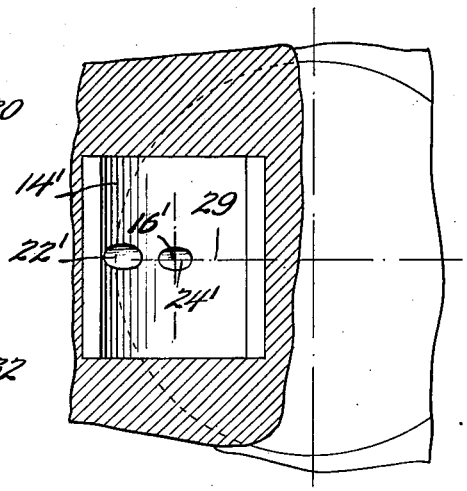
Inventor
Richard H. Sheppard,
By Snelling & Hendricks
Attorneys.

Patented Feb. 3, 1942

2,271,606

UNITED STATES PATENT OFFICE 2,271,606

COMBUSTION CHAMBER

Richard H. Sheppard, Hanover, Pa.

Application September 14, 1938, Serial No. 229,947

10 Claims. (Cl. 123—32)

This invention relates to Diesel engines, and has for its general object the provision of an improved combustion chamber having more efficient turbulence during the injection period.

The primary object of my invention is to provide an arrangement of combustion chamber and cylinder which reduces to a great extent the amount of solid fuel impinging against the enclosing surfaces thereby improving the combustion by reducing smoldering and resulting carbon deposit. Smoldering, indicated by smoky combustion, is chiefly due to lack of air, at the point of contact with the surfaces, and therefore by increasing the ratio of air to the portion of solid fuel touching the hot surfaces I reduce the smoldering and without changing the ratio of total air to total fuel charge.

A specific object is to provide a combustion chamber arrangement whereby a portion of the fuel charge and particularly the larger droplets of fuel occurring at full load are directed into the upper central portion of the cylinder.

A further specific object is to provide a combustion chamber in which the fuel charge is insulated from the surface by a layer of air.

An important object is to provide a combustion chamber plug to be substituted in existing engines having spherical or cylindrical combustion chambers to increase the efficiency of such engines.

In the drawing:

Figure 1 is a vertical sectional view of the upper part of an engine showing the cylinder and combustion chamber.

Figure 2 is a partly sectional plan view taken on line 2—2 of Figure 1.

Figure 3 is a fragmentary view similar to Figure 2 but of a modified form.

In Figure 1 the engine block 10 is shown as having a cylinder 11 and cylinder head 12, with a combustion chamber 14 located in the head 12. The combustion chamber is preferably of spherical shape and has at the top a fuel injection nozzle 15 which is adapted to inject a jet of fuel having its axis 16 approximately in the vertical diameter of the chamber.

The upper part of the combustion chamber is formed by the hemispherical termination 17 of the bore 18 in the cylinder head 12 and the lower part is a complementary cavity in the upper face of what may be termed a throat block or plug 19 fitting in the bore and in which it is held by its bottom face being engaged by the top of the cylinder block; a screw 20 on the edge of the plug, as best shown in Figure 2, prevents rotation of the plug from its preferred angular position. Although a spherical chamber is preferred I find that a chamber having circular cross section in planes parallel to the axis of the cylinder is also satisfactory.

The throat block or plug 19 is provided with a main throat 22 and an auxiliary throat 24, the outer wall 23 of the main throat being tangential to the surface of the chamber whereby air rushing through will rotate in the chamber about its axis which in the drawing is a horizontal axis. The auxiliary throat 24 is at a slight angle to the tangent of the chamber wall and is positioned to direct the outgoing charge toward the center 25 of the upper part of the cylinder and has its orifice 27 located to receive droplets from the injector nozzle 15, that is, the axis of the fuel jet passes through the orifice 27. The throat 24 is positioned to produce a layer of air within the layer of air created by the air rushing through the main throat 22 into the chamber. Whether the combustion chamber is spherical or is cylindrical in shape the throat block is positioned for best results with the axis of the throat 24 in a radial plane of the cylinder and the main throat 22 is preferably but not necessarily located with its axis in the same plane whereby the fuel charge is directed toward the center of the cylinder. As shown in Figure 1, the axis of the main throat lies at an angle of 72° and that of the second or auxiliary throat is less steep, lying at an angle of 40°. Contrary to prior practice both of the throats discharge air from the cylinder into the chamber to revolve in the same direction. Under full load, a large percentage of the fuel reaches the opposite side of the combustion chamber and enters the throat 24 without being atomized, so that the out-rushing fuel charge carries, or at least starts, these relatively large droplets directly toward the center of the cylinder, thus producing efficient combustion by reducing to a minimum the amount of solid fuel contacting the enclosing walls. The throat 24 is preferably positioned so that its axis intersects the cylinder axis 25 at a point spaced from the cylinder head a distance not much greater than the length of the throat.

In the plan view, Figure 2 showing the preferred relative position of the parts, it will be seen that the vertical plane 29 containing the vertical axis 16 of the combustion chamber bisects both throats and lies between the exhaust valve 30 and the intake valve 32.

In Figure 3 is shown a sectional plan view of an engine in which my invention is used in cylindrical form, that is, the combustion chamber 14' is a horizontal cylinder having the tangential port 22' and the auxiliary jet receiving port 24' bisected by an axial plane 29 of the cylinder, on which plane the sectional view is like that in Figure 1.

The high efficiency of combustion obtained by my engine under all loads is believed to be due to the fact that a minimum of solid fuel touches the hot enclosing surfaces and this for two reasons: first, the air entering the combustion chamber through the throat 22 during compression forms an insulating layer of air between the surface of the chamber and the atomized fuel from the fuel nozzle and the main fuel charge is contained mainly in an inner layer formed by the air entering the chamber through the throat 24, and, second, under full load at which time the fuel feed is maximum, the droplets injected pierce both blankets of rotating air without being completely atomized and enter the orifice 27 of the throat 24, so that as combustion takes place these relatively large droplets are directed toward the center of the cylinder 11. The rarer portion of the fuel charge is directed by throat 22 into the outer region of the cylinder near the top wall. Thus, we have a combustion charge in the cylinder having a rich center and a rarer outer portion which is contrary to the accepted theory that the mixture of air and fuel should be uniform for maximum efficiency. The efficiency theoretically lost due to the non-uniform mixture of the fuel charge is compensated for by the substantial elimination of improper surface contact burning.

Other theories have been advanced to explain the high efficiency I have obtained but the one given seems to satisfy the different factors present. It is understood, of course, that the two layers of air are by no means distinct but it is believed that the layer produced by the throat 22 does prevent a considerable portion of the solid fuel from contacting the chamber surface and the small amount touching the walls has sufficient air to support combustion without smoldering. It is also to be understood that the mixture of air and fuel enveloped in the layer of insulating air in the chamber becomes substantially uniform before ignition and that the richer mixture in the throat 24 is chiefly due to the presence of the larger droplets, at full load, injected directly into the throat.

What I claim is:

1. In an internal combustion engine of the liquid fuel injection type, a cylinder, a spherical combustion chamber, a fuel jet nozzle positioned to inject a jet of fuel through the center of the chamber, and means having a main and an auxiliary throat providing communication between the cylinder and chamber, the main throat having one wall tangential to the wall of the chamber, the auxiliary throat having its axis intersecting the axis of the cylinder and the axis of the fuel jet, the axis of the fuel jet passing through the orifice of said auxiliary throat, whereby droplets of fuel thrown into said auxiliary throat are carried directly to the center of the cylinder.

2. In an internal combustion engine of the compression ignition type, a cylinder block having a cylinder bore, a cylinder head having a cavity therein shaped at one end with a partial surface of revolution, a throat block in said cavity having a complementary partial surface of revolution registering with the first mentioned surface to form a combustion chamber, said throat block having a throat directed toward the surface of the chamber at the junction of the throat and chamber to create a rotating layer of air in the chamber adjacent said surfaces and having a second throat directed inward of said junction to create a second layer of rotating air in said chamber nearer the center, and a nozzle discharging a jet of fuel into the chamber in a direction to cause the jet to cross both of said air streams.

3. In an internal combustion engine of the liquid fuel injection compression ignition type, the combination with an engine cylinder, of a combustion chamber outside of but communicating with the cylinder, said chamber being circular in cross section with respect to planes parallel to the axis of the cylinder and normal to a horizontal axis through the chamber, a throat block having two throats providing communication between the cylinder and chamber, one throat being positioned to create a layer of air adjacent the inner surface of the chamber about said axis and the other throat being positioned to create a second layer of air within said first layer and the axis of said second throat intersecting the axis of the cylinder, and a fuel injection device positioned to inject a jet of fuel across a substantial width of said chamber and having the axis of the fuel intersecting the orifice of the second throat whereby fuel droplets travelling across the chamber enter the second throat and are directed toward the center of the cylinder.

4. The device of claim 2 in which the cylinder axis is vertical, the axes of the throats lie in a plane through the center of the cylinder, and the second throat opens at the lowest point of the chamber.

5. In an internal combustion engine of the compression ignition type having a cylinder bore, means providing a spherical combustion chamber and main and auxiliary passageways between the chamber and cylinder, and a fuel injection nozzle positioned to inject a jet of fuel diametrically across the chamber into the auxiliary passageway, said passageways being substantially straight and having their axes in a radial plane of the cylinder, and the axis of the jet produced by the nozzle lying in said plane, the central axis of the auxiliary passageway intersecting the cylinder axis at a point positioned from the top of the cylinder a distance substantially equal to the length of the throat.

6. The device of claim 2 in which the second throat is positioned to direct a portion of the fuel charge toward the axis of the cylinder.

7. In a Diesel engine, a cylinder, a combustion chamber, an injection device discharging into said chamber, and a plurality of throats connecting said chamber and cylinder, one of the throats discharging air tangentially into the cylinder to one side of the fuel jet from the injection device, and a second one of said throats having a fuel receiving opening in line with the discharge of the injection device and a fuel discharge opening directed to the axis of the cylinder and discharging air from the cylinder into the chamber tangentially of the air stream from said one throat, so that both air streams will rotate together.

8. The device of claim 7 in which the chamber is bounded by a surface of revolution, the device discharges at the highest point of the chamber and the fuel receiving opening is at the lowest point of the chamber.

9. The device of claim 7 in which the surfaces of the throats are conical, and their axes make angles of about 72° and 40° respectively with a plane normal to the axis of the cylinder.

10. In a Diesel engine, a body having therein a combustion chamber, a cylinder, means discharging Diesel fuel into said chamber, and two throats connecting the chamber and cylinder, characterized by one of said throats leading tangentially from the wall of the chamber to a point near the wall of the cylinder, and said other throat leading from the chamber at a point opposite the fuel discharge into the chamber in a direction to discharge fuel across the axis of the cylinder, the cross-sectional area of the first throat being greater than that of said other throat whereby the tangential discharge of air through the larger throat causes the ratio of the air to the portion of the fuel which contacts the inclosing surface of the chamber to be greater than the ratio of air to fuel in the center of the chamber, whereby the charge is leanest adjacent the inclosing surfaces and is inceasingly richer toward the centers of the chamber and the cylinder, thereby minimizing smoldering and the depositing of carbon.

RICHARD H. SHEPPARD.